Dec. 13, 1966  F. BROSSA ET AL  3,291,700
NUCLEAR REACTOR FUEL ELEMENT HAVING A DIFFUSION BARRIER
Filed Nov. 6, 1963  5 Sheets-Sheet 1

INVENTORS
Lucien ALFILLE
Francesco BROSSA
Roger THEISEN

ATTORNEYS

INVENTORS
Lucien ALFILLÉ
Francesco BROSSA
Roger THEISEN

*ATTORNEYS*

INVENTORS
Lucien ALFILLE
Francesco BROSSA
Roger THEISEN

ATTORNEYS

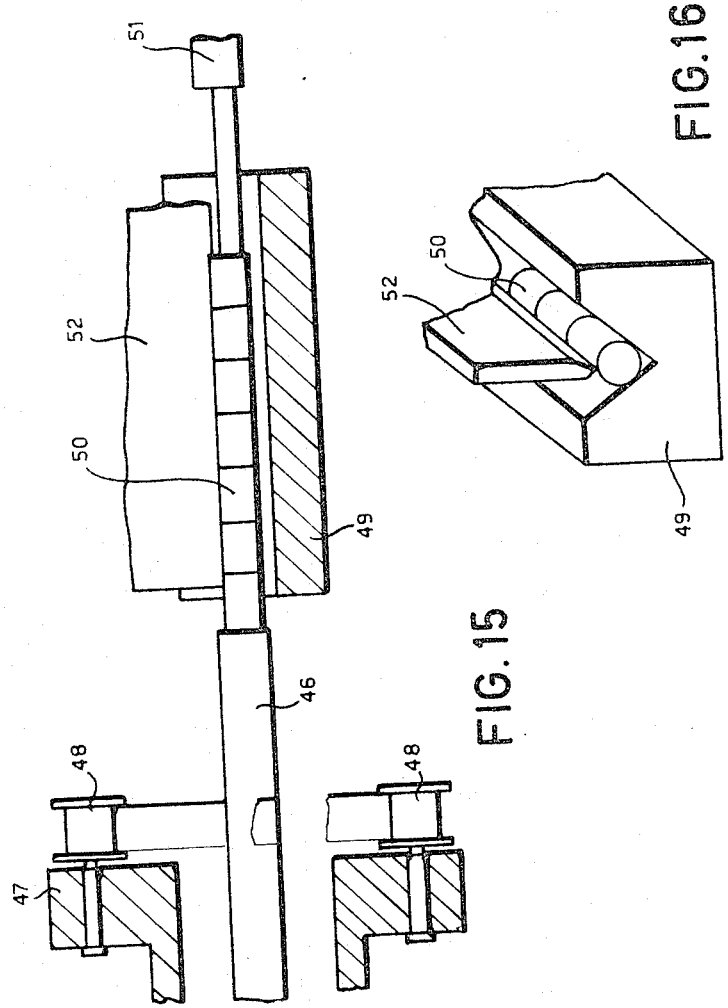

United States Patent Office 3,291,700
Patented Dec. 13, 1966

3,291,700
NUCLEAR REACTOR FUEL ELEMENT HAVING A DIFFUSION BARRIER
Francesco Brossa, Poirino, Turin, and Roger Theisen, Ispra, Varese, Italy, and Lucien Alfillé, Brussels, Belgium, assignors to European Atomic Energy Community—EURATOM, Brussels, Belgium
Filed Nov. 6, 1963, Ser. No. 321,826
Claims priority, application Belgium, Nov. 16, 1962, 499,649
26 Claims. (Cl. 176—82)

This invention relates to fuel elements for uranium or uranium alloy or ceramic fuelled nuclear reactors, more particularly for power reactors cooled by a pressurised fluid heat vehicle, mainly comprising a diffusion barrier between the fissile fuel, in the form of a rod or plate or metal or ceramic pastilles stacked one above another, and the protective canning made of a material which diffuses with the fuel, inter alia aluminium, zirconium and their alloys.

Interdiffusion between the uranium or alloy forming the fissile fuel of the fuel elements and the aluminium or aluminium-based alloys or other materials forming the protective canning against the corrosive action of the cooling fluid occurs of course in nuclear reactors even at relatively low temperatures (from 200 to 250° C.). What will be described hereinafter refers particularly to aluminium, but it is to be understood that this invention refers to all those canning materials, such as zironium and its alloys, which diffuse with the fuel. Similarly, the explicit reference to uranium does not limit the kind of fuel with which the invention is of use, and the invention also covers fuels other than uranium and its alloys, including ceramic fuels.

Interdiffusion, which occurs quite rapidly and in which uranium diffuses more into aluminium than vice versa, leads to rapid damaging of the canning as a result of the formation of usually fragile compounds, with the result that the fuel element ceases to be hermetic to fission products and the uranium is corroded by the cooling fluid. In endeavours to inhibit this phenomenon, the composition of the aluminium alloy in contact with the uranium has been modified, for instance, by using the eutectic Al-Si; also, inhibitory protection has been introduced between the fuel and the canning to form a frontier between the uranium and the aluminium and to inhibit interdiffusion therebetween even at high temperatures and during the required utilisation time of the fuel element in the reactor. Of course, the conventional procedure for producing a diffusion barrier of this kind between the fuel and the canning is either to produce a thin ceramic layer prepared by oxidation of the surface of the fuel or of the canning or to use chemical or electrochemical depositing or vapour coating to provide the fuel surface with a thin metal layer, for instance, of nickel or niobium or chromium or vanadium, or with an alloy or with a mixed binary or ternary layer of such substances, the resulting metal layer bonding the two components—the fuel and the canning—together by simultaneous diffusion, very often by means of the canning operation which is performed hot and with hydrostatic pressure.

The main disadvantage of diffusion barriers of this kind is that the protective layer may be friable or break up into scales in the case of oxide layers or have a local defect in the case of metal layers because of distortions of the fuel and of the canning, with the possible result in a power reactor of impairing the safety of the fuel elements, for of course the ability of such diffusion barriers to reliably inhibit, for instance, uranium-aluminium diffusion throughout the whole desired fuel utilisation time in the reactor is based on strict maintenance of the constancy of the thickness of the protective layers, such thickness being determined in accordance with the diffusion rate at a predetermined temperature.

Also, because of the nature of the protective layers the safety provided by the known barriers depends exclusively on control of barrier quality, and the control is necessary to ensure that the lining or the like provided is sticking satisfactorily and is compact and is throughout of the same thickness, for the slightest flaw, even if a pin point, would lead to the canning rupturing at the end of a predetermined time because of the conditions of use of the fuel in the reactor. This need for checking the barrier reduces their reliability and therefore leads to the use of layers thicker than theoretically required; these thick layers are usually made of an absorptive substance and impair neutron economy.

Another disadvantage is that the strict inspection necessary leads to a high rate of rejects in series manufacture.

Also, in the case of fuels in pastille form, more particularly ceramic fuels, the traditional methods are much more difficult to use than with cylindrical rods since further factors which depend upon the nature of the ceramics must be considered, such as porosity, ceramic-metal mixture and so on.

There is another and even greater disadvantage of an economic nature, and this is the technique for manufacturing conventional diffusion barriers, since the same require techniques which considerably increase manufacturing costs, for the cost of preparing the surfaces of uranium rods, a step associated with relatively expensive techniques such as vapour coating in vacuo, electrochemical deposition and chemical deposition, has considerable effect on the manufacturer's first costs and on the costs of actually effecting the deposit. Another factor which raises costs is the need to provide sensitive and accurate means for making a thorough inspection of the local quality of the protective deposits.

The subject matter of this invention is a fuel element which comprises a diffusion barrier of novel and simple design and free from the disadvantages of the known barriers, the invention using a mechanical technique which is very effective, easy to supervise and cheap to carry into effect.

It is a main object of the invention to provide a fuel element of the kind just specified which, comprising a diffusion barrier prepared by a covering of very thin strip made of anti-diffusion materials, can be either of the connected can type, in which the fuel is in the form of a rod which can be smooth or which can be grooved for anchorage in the can, or of the free can kind the fuel of which is in the form of metal or ceramic pastilles.

Another object of the invention is to provide the use in such an element, for the anti-diffusion barrier, of substances or alloys which are otherwise unusable or which cannot be prepared electrochemically or chemically or by vapour coating by the conventional known methods.

It is another object of the invention to provide a fuel element wherein the diffusion barrier prepared by means of a consecutive covering by strips or tapes or the like of different kinds can provide binary or ternary diffusion barriers as good as or better than those provided by the known methods or which leads to combinations equivalent to protective layers which cannot be produced with chemical or electrochemical techniques.

It is another object of the invention to provide for such an element chemical or metallurgical treatments of the tapes or strips or the like forming the barrier so that the surface of the tapes or strips or the like can receive substances or compounds which increase the diffusion resistance at elevated temperatures.

It is yet another object of the invention to provide, in a fuel element whose diffusion barrier is in the form of a strip covering, the use of surface oxided strips to ensure that the oxide, which is friable and may flake away, is maintained by the support formed by the metal strip.

It is another object of the invention to provide, for a fuel element whose diffusion barrier is formed by a covering of a number of layers of strips, the use of such layers as a backing for reduced thicknesses of low melting point substances, with a view to improving heat transfer as well as providing a diffusion barrier.

It is another object of the invention to disclose a method of providing on a nuclear reactor fuel element a protective layer forming the diffusion barrier by means of a covering of thin metal strips or tapes or the like.

It is another object of the invention to provide, for constructing the diffusion barrier of a fuel element of the free can kind, apparatus for winding thin metal strip around fuel pastilles.

According to the invention, the diffusion barrier is a lining in the form of a very thin diffusion-inhibiting strip or tape or the like which, when wound around the fuel in a sufficient quantity to provide the required barrier thickness between the can and the fuel—means being provided to retain the strip or tape or the like in position—forms a continuous covering of the fuel outside surface so that such lining or the like forms at the formation of the element, and before the fuel charge thereof is introduced into the protective canning, a flexible sheathing which envelops the charge or a fraction thereof at least on the fuel side surface.

According to another feature of the invention, the terminal parts of the fuel charge of the element or of a portion of such charge are covered by at least some of the cylindrical parts of the or each wound strips or tape or the like extending beyond such ends and being bent and folded back thereon, the bent parts being secured to one another by welds made by any known welding or metallurgical bonding process.

According to another feature of the invention, the terminal parts of the element fuel charge or of a proportion thereof are covered by means of a hood of the same material as the strip or tape or the like, the hood being pushed onto the lateral lining or the like terminating at the level of the ends, the hood being secured to the lining or the like by welds on its lateral collar, the welds being made by any known welding or metallurgical bonding process.

Further features of the invention will be described by way of non-limitative example with reference to the accompanying drawings wherein.

Figure 1:
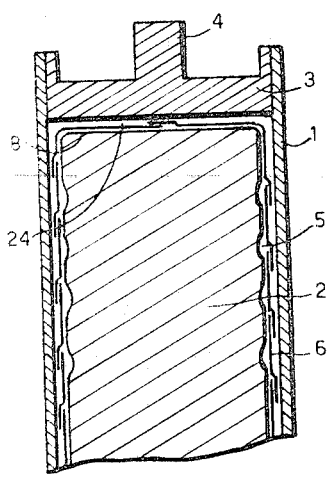
FIGS. 1 and 2 are diagrammatic views in longitudinal section of two uranium rod fuel elements of the grooved and smooth kind respectively, each having a diffusion barrier according to the invention, before the hydrostatic canning step.
Figure 2:
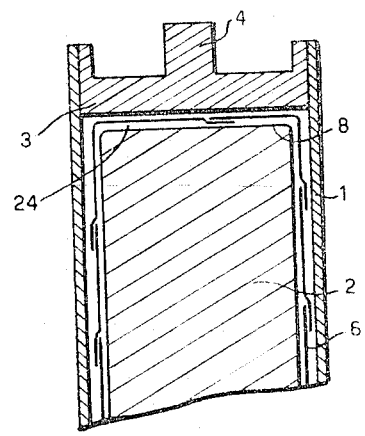
Figure 3:
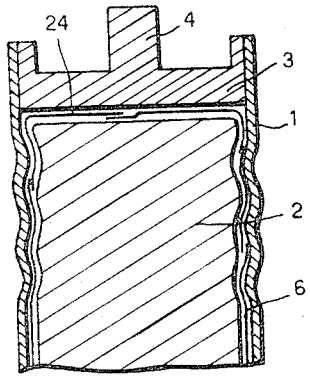
FIG. 3 shows the element illustrated in FIG. 1 after the hydrostatic canning step.
Figure 4:
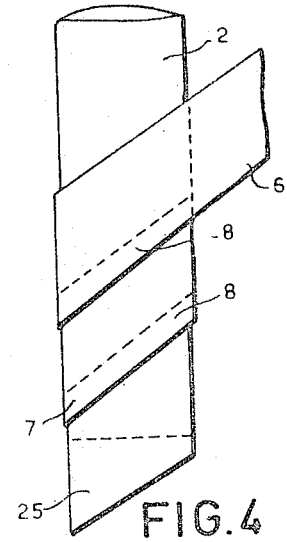
FIGS. 4 and 5 show two ways of winding strip or tape or the like helically around a fuel rod.

Referring first to the fuel elements which are illustrated in FIGS. 1–3 and which have a diffusion barrier in accordance with this invention, a cylindrical sheath or can 1, for instance, of aluminium or an aluminium alloy, receives a fuel rod 2. A plug 3 has a central teat or the like 4 for engaging the pencil in the assembly cross-pieces or shelves of the bunch. The fuel element is formed with circular or helical grooves 5 for anchoring the can or sheath or the like 1.

According to the invention, an anti-diffusion barrier between the can 1 and the rod 2 is provided by a metal tape or strip or the like 6 which is so wound around the rod as to cover the same over its whole length. The strip 6 is formed by a thin sheath of a diffusion-inhibiting substance, such as nickel or 18/8 stainless steel; the strip height can be 50 mm. and its minimum thickness can be between 0.01 and 0.005 or 0.002 mm., depending upon the nature of the material. The sheet or foil or the like is wound until it forms the exact barrier thickness necessary—i.e., sufficient to provide a satisfactory diffusion barrier between the fuel and the can.

The materials usable for the strip 6 are very varied, and nickel, vanadium, titanium, zirconium, tantalum, beryllium, niobium, iron and stainless steel can be mentioned as examples.

To ensure continuity of the lining or covering or the like over the fuel element surface, the strip 6 is wound helically around the fuel rod so that each turn of the strip overlaps the immediately previous turn in the manner illustrated in FIGS. 1–4. To maintain the winding in position, the overlapping parts are secured by weld zones 7 to the ends of the rod; if required, weld zones 8 can be distributed along the whole length of the pencil while still leaving some flexibility to the lining or covering or the like. The weld zones can be spots or lines or welded surfaces produced, for instance, by electric welding or ultrasonic welding or metallurgical bonding (diffusion, brazing and so on).

In the embodiments illustrated in FIGS. 1 and 3, the shape of the grooves 5 and the corners of the end parts 8 of the rod 1 are rounded to remove sharp edges, to ensure that the strip 6 is not cut during the hydrostatic canning step.

Figure 5:
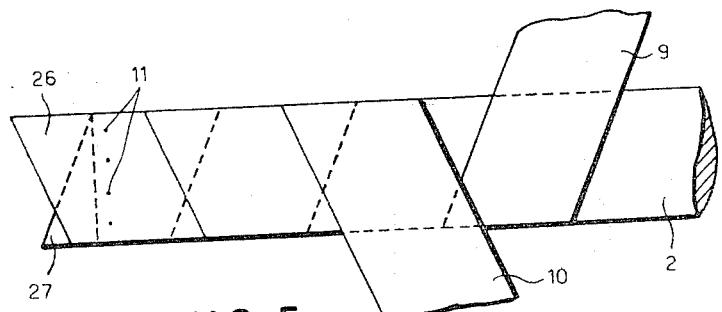

In the embodiment illustrated in FIG. 5, the anti-diffusion covering of the fuel rod is provided by two strips or tapes or the like 9, 10 which are wound helically around the rod with contiguous edges and to opposite hands. In this embodiment continuity of covering is ensured by so offsetting the winding of the top strip 10 that it cuts the joints of the bottom strip 9; retention, which is provided by weld zones 11, is by securing the places near the rod ends. In an alternative form of this embodiment (not shown), and using two strips, the same are wound helically to the same hand and with contiguous edges but with an offset from one another of half a pitch to cut the joints.

Figure 6:
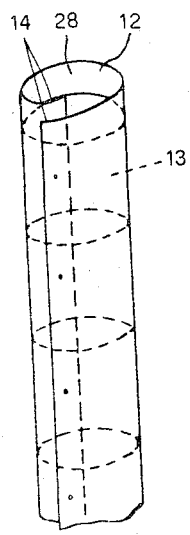
FIGS. 6 and 7 illustrate a different way of embodying a strip barrier.
Figure 7:
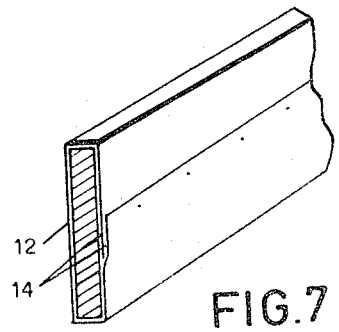

Another embodiment of the barrier is illustrated in FIGS. 6 and 7. In this case the lining or covering or the like is in the form of a thin metal sheet or foil or the like 12 whose height is slightly greater than the height of the fuel; the latter take the form either of stacked pastilles 13, as illustrated in FIG. 6, or of a single cylindrical member, like the rod illustrated in FIGS. 1–4, or of a uranium plate, as in FIG. 7. When wound lengthwise the foil 12 envelops the fuel like a sheet of cigarette paper, with a slight overlap at the foil longitudinal edges 14, zones for securing the protective screening in position being provided in the overlap region.

Figure 8:
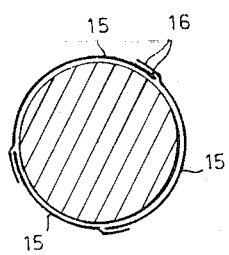
FIGS. 8–11 illustrate alternative forms of what is shown in FIGS. 6 and 7.
Figure 9:
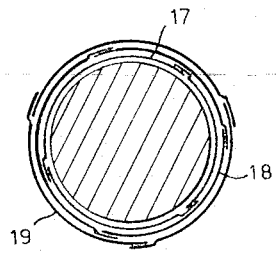
Figure 10:
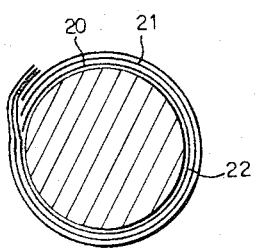

Another variant is illustrated in FIG. 8 and is of use in cases where the width of the strip-like sheeting is not enough to cover the entire surface of the fuel. In this embodiment a number of strips 15 are wound around the fuel one after another widthwise, with a slight overlap for securing purposes at the adjacent longitudinal edges 16 of the strips 15. A number of layers of very thin foils can be wound in this way to the required barrier thickness; for instance, from one to three layers can be provided one above another as shown by way of example in FIG. 9, which relates to FIG. 6 and in which the consecutive layers 17, 18, 19 are wound one upon another with the overlapping zones of any one pair of layers staggered relatively to the overlapping zones of any other pair of layers; alternatively, the system illustrated in FIG. 10 can be used where the layers 20–22 are wound together. In this latter case, the strip-like foils must be cleaned very thoroughly to reduce the temperature drop in the strip-contacting zones; in any case the presence of a number of surfaces provides improved resistance to the diffusion of uranium to aluminium for a given total barrier thickness, since the independent surfaces of the sheets help to inhibit diffusion because of the presence of oxides, contaminations and so on.

Figure 11:
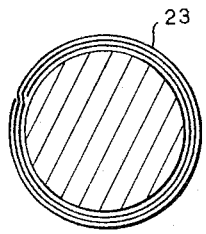

In the variant illustrated in FIG. 11, a single strip-like sheet 23 can be wound widthwise in a number of consecutive turns.

Figure 12:
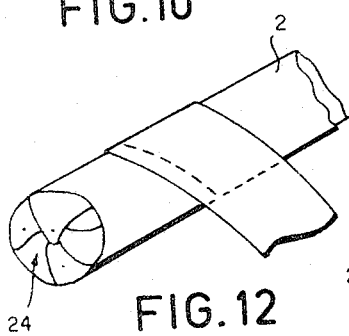
FIGS. 12 and 13 illustrate two different possibilities for the end of the tape lining or the like, and FIGS. 14–16 diagrammatically illustrate two different ways of winding metal tapes or strips or the like around fuel pastille assemblies.

To ensure continuity of the barrier in the terminal parts of the fuel where there may be contact between the uranium and the can closure plugs, the strip covering is extended to form a part 24 (see FIGS. 1, 2 and 3) which covers the end faces of the fuel forming the pencil charge or, in the case of pastilles and of long pencils, of a portion thereof. This is achieved, as shown in FIG. 12, by means of cylindrical parts 25 of the tape illustrated in FIG. 4 and by means of parts 26, 27 of the strips 9, 10 illustrated in FIG. 5, and of the part 28 illustrated in FIG. 6, all such parts extending beyond the terminal part of the rod 1 or pastille stack 13, then being folded on themselves and over the end faces of the fuel, then interconnected.

Figure 13:
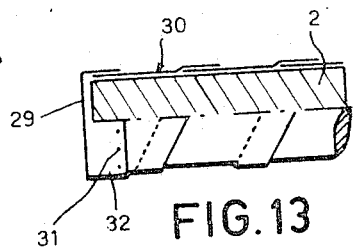

In the variant illustrated in FIG. 13, the strip parts which extend beyond the end faces of the fuel 2 are cut, and a hood or sleeve or the like 29, in the form of a cupola formed by stamping a thin sheet of the same material as the strip, is pushed into the ends of the fuel. The element 29 is connected to the strip covering 30 by welding, for instance, by weld spots 31, to a side collar 32.

Binary and ternary diffusion barriers can readily be provided by the use of a number of layers of helical metal strip or of covering sheets of different kinds wound one upon another. Multiple-layer systems using a single material, together with the use of strips oxided on the or each of their surfaces, can provide a mixed metal-oxide barrier with thin layers of oxide between the strips which act as a frame for the thin friable and flaky oxide layers. In these systems, a thin layer of a low-melting-point material can be deposited on the or each surface of the strip with a view to reducing contact heat resistance in cases where the barrier thickness is subdivided into a number of layers. Also, the use of chemically or metallurgically treated strips—e.g., on which a very thin film has been deposited, for instance, by thinning or galvanising—for these multiple layers leads to barriers in which the deposited materials increase the diffusion inhibition properties at high temperature.

Figure 14:
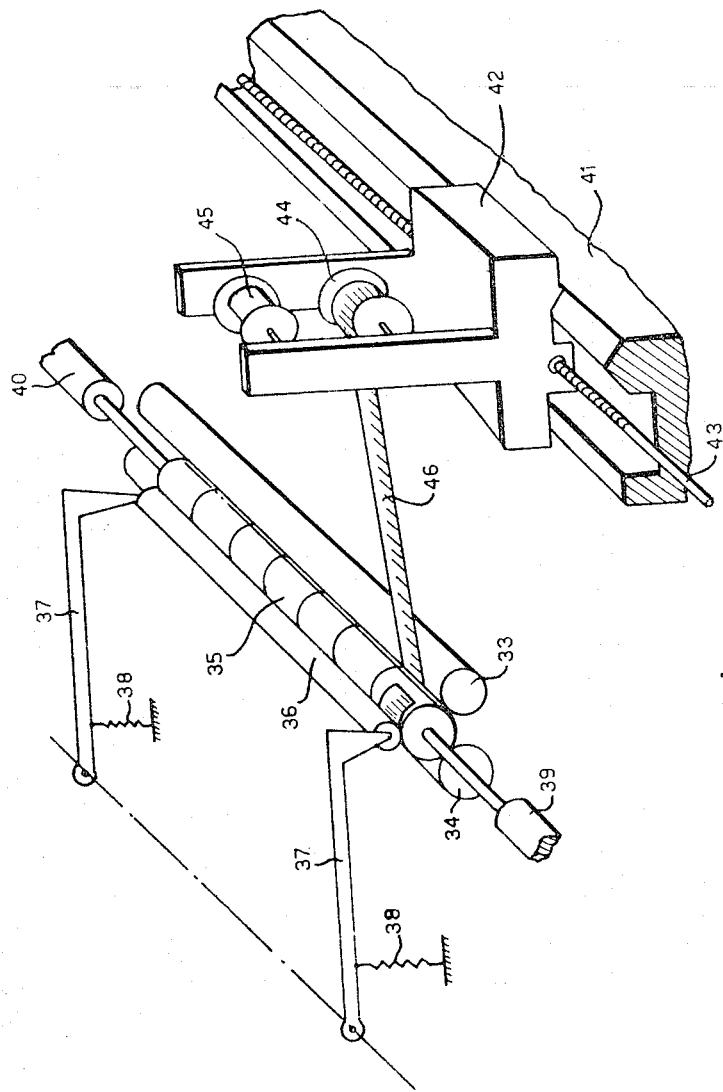

The invention provides an apparatus of the kind illustrated in FIG. 14 for winding strip around pastilles forming a fuel charge or around a part thereof of a free can element. In such apparatus, two parallel cylindrical rollers 33, 34, one of which is a driving roller, are disposed at a spacing such that fuel pastilles 35 rest in the roll nip. A top roller 36 is fitted to an articulated device 37 and maintains the pastilles in the nip by means of springs 38. The three rollers 33, 34, 36 are covered with a rubberised rubbing surface. The pastilles 35 which are rotated by the roller system have an axial thrust applied to them by pneumatic pressure through the agency of retractable live-centre devices 39, 40. A bed 49 whose axis is parallel with the axis of the rollers has slidingly mounted on it a moving carriage 42 driven by a lead-screw and nut device 43. Reels 44, 45 of strip material are mounted on the carriage 42 for free rotation around themselves. After the strip 46 has been placed on the or each first pastille, the same is or are helically covered by the rotation of the rollers 34, 35 and the displacement of the carriage 42, movement-transmitting means being provided between the rollers and the device 43. Upon the completion of taping and when the strips have been secured, the ends are bent or covered with a sleeve or hood or the like. One of the live centres 39 or 40 retracts and is replaced by the canning tube, whereafter the encased charge of pastilles is forced by the other centre 40 or 39 to slide into the can.

In another embodiment which can be seen in FIGS. 15 and 16, an expanding mandrel 46 disposed along the axis of a rotating face plate 47 has strip reels 48 mounted on it along various parallel axes. The mandrel 46 and the face plate 47, which are mechanically interconnected by means of movement-transmitting means leading to a rotating helical motion enabling the face plate to advance one step along the mandrel at each revolution, enable the mandrel to be wrapped with one or more layers of strips. A V guide 49 disposed in extension of the mandrel axis bears a number of fuel pastilles 50, one end of which is forced against the exposed surface of the mandrel by a pneumatic piston 51 which is operative on the other end of the pastilles. The pastilles, which are axially centred in the V guide 49, are kept stationary therein by a knife 52. After the mandrel has been wrapped, it is retracted and moved by a piston 59 which simultaneously introduces the pastilles into the wrapping of strip material.

The substitution in diffusion barriers of the conventional metal layers produced by deposition on the fuel by a wound layer greatly simplifies the production of the barriers by speeding up operation and providing a considerable economy in production. Also, the parasitic absorption likely with a barrier according to this invention is very tolerable from the neutron point of view and in the case of metal fuel can be recovered in can thickness, the parasitic absorption being equivalent only to a few tenths of a millimetre of aluminium, for with a layer of stainless steel strip, for instance, 0.01 mm. thick and 50 mm. wide wound helically with an approximately 20% overlap, parasitic absorption is equivalent to 0.2 mm. of aluminium. In designs comprising a number of layers one above another, vapour transfer during the first stages of operation before diffusion of the strip with uranium is insignificant for the diffusion reaction. Also, in the case of ceramic pastilles, the fact that the strip can be wound helically or as a sheet means that dimensional adaptation is possible and that such arrangements act as intermediaries in the ceramic-to-can heat contact, with a resulting easing of dimensional tolerances.

Also, in such designs the lining or the like forming the diffusion barrier for the number of pastilles necessary to charge a pencil or for fractions of such number, depending upon the subdivision of the fuel charge in the case of relatively long pencils, forms in practice a kind of can or sheath which facilitates the positioning of the charge in the actual can, for the or each assembly of encased pastilles, having been secured by welding to the ends or spot-welded in the helical overlapping part, in the sense obviating unwinding or pulling away, is pushed into the canning tube which is closed at one end, and once the charge has been positioned the can is closed normally.

The invention has been described with reference to particular embodiments but is of course not limited thereto and covers many variants and modifications.

For instance, in the apparatus illustrated in FIGS. 15 and 16 the assembly comprising the V guide 49 and the knife 52 can be embodied by a roller system of the same kind as formed by the rollers 33, 34, 36 in the embodiment illustrated in FIG. 14.

We claim:
1. Fuel element for nuclear reactors, more particularly for power reactors cooled by pressurized fluid heat vehicle comprising a fuel member consisting of fissile fuel, a protective canning surrounding the fuel member, the said canning being made of a material which diffuses with the fuel member, a diffusion barrier between the fuel member and the protective canning, the said barrier consisting of a diffusion-inhibiting lining formed by a strip wound around the fuel member to prevent the diffusion of the fuel through the protective canning.

2. Fuel element as recited in claim 1, wherein the lining envelops at least a fraction of the fuel member.

3. Fuel element as recited in claim 1, wherein the fuel element consists of uranium or a uranium alloy.

4. Fuel element as recited in claim 1, wherein the fuel member is selected from metal or ceramic pastilles.

5. Fuel element as recited in claim 1, wherein the fuel member is shaped as a rod or plate.

6. Fuel element as recited in claim 1, comprising retaining means provided to hold the strip in position.

7. Fuel element as set forth in claim 1, wherein the lining forming the diffusion barrier is formed by a strip wound widthwise around the fuel member, the longitudinal edges of the strip forming a zone of reduced covering.

8. Fuel element as set forth in claim 1, wherein the lining comprises a number of strips wound consecutively one upon another with staggered covering edges.

9. Fuel element as set forth in claim 1, wherein the lining forming the diffusion barrier is formed by a strip wound widthwise around the fuel member and forming a number of consecutive turns.

10. Fuel element as set forth in claim 1, wherein the lining forming the diffusion barrier is formed by a number of strips wound widthwise around the fuel.

11. Fuel element as set forth in claim 1, wherein the lining forming the diffusion barrier is formed by a number of strips which are wound widthwise around the fuel member and which are disposed consecutively on the side surface with overlapping of adjacent longitudinal edges and form a single layer on the fuel.

12. Fuel element as set forth in claim 11, wherein the lining comprises a number of layers and placed one upon another with staggered overlapping zones.

13. Fuel element as set forth in claim 1, wherein the lining forming the diffusion barrier is formed by a strip wound helically around the fuel member, the edges of the strip partially overlapping.

14. Fuel element as set forth in claim 6, wherein the retaining means consist of welds made on the overlapping edges of each strip.

15. Fuel element as set forth in claim 13, wherein the lining comprises a number of layers and staggered by a fraction of the helix pitch to provide the staggering of the overlapping edges.

16. Fuel element as set forth in claim 13, comprising retaining means to hold the strip in position the said retaining means being formed by welds made at least on the overlapping edges corresponding to the terminal parts of the fuel member.

17. Fuel element as set forth in claim 1, wherein the lining forming the diffusion barrier is formed by at least two strips wound helically one upon another with contiguous edges to opposite hands.

18. Fuel element as set forth in claim 1, wherein the lining forming the diffusion barrier is formed by at least two strips wound helically one upon another with contiguous edges and to the same hand, the top strip being staggered by half a pitch so as to cut the joints of the bottom strip.

19. Fuel element as set forth in claim 17, comprising retaining means to hold the strip in position the said retaining means being formed by welds made at least on the overlapping zones of two strips or tapes or the like corresponding to the terminal parts of the fuel by any known welding or metallurgical bonding process.

20. Fuel element as set forth in claim 1, wherein the strip is wound beyond the extremities of the fuel member, and then bent over said extremities, the bent parts being secured to one another by welds.

21. Fuel element as set forth in claim 1, wherein the extremities of the fuel member are covered by a hood of the same material as the strip, the hood being pushed on to the lining and secured to the said lining by welds.

22. Fuel element as set forth in claim 1, wherein the lining is formed by a plurality of layers of strip placed one above another, the consecutive layers being formed by different kinds of material so as to provide mixed binary or ternary barriers.

23. Fuel element as set forth in claim 1 wherein the lining is formed by a plurality of layers of strip placed one above another, the diffusion barrier lining being covered on at least one surface by a thin oxide coating.

24. Fuel element as set forth in claim 1, wherein the lining is formed by a plurality of layers of strip placed one above another, a thin coating of a low-melting-point material being deposited on at least one of the surfaces of the strips to reduce the heat transfer resistance between the layers.

25. Fuel element as set forth in claim 1, wherein the fuel member is a metal fuel rod formed with grooves for anchorage to the protective canning.

26. Fuel element as set forth in claim 1, wherein the strip is made of a substance selected from stainless steel, iron, nickel, vanadium, titanium, tantalum, zirconium, beryllium, niobium.

References Cited by the Examiner

UNITED STATES PATENTS

| | | | |
|---|---|---|---|
| 1,899,850 | 2/1933 | Burton et al. | 242—11 |
| 2,036,887 | 4/1936 | Rolfs | 242—11 |
| 2,872,041 | 2/1959 | Wigner et al. | 176—82 |
| 2,873,238 | 2/1959 | Ohlinger et al. | 176—82 X |
| 3,063,888 | 11/1962 | Howard et al. | 156—187 |
| 3,089,805 | 5/1963 | Schmidt | 156—187 |
| 3,098,024 | 7/1963 | Barney et al. | 176—82 |

FOREIGN PATENTS 670,910  9/1963  Canada.

L. DEWAYNE RUTLEDGE, *Primary Examiner.*

R. L. GRUDZIECKI, *Assistant Examiner.*